(12) United States Patent
Ekpenyong et al.

(10) Patent No.: US 11,818,717 B2
(45) Date of Patent: Nov. 14, 2023

(54) METHOD AND APPARATUS FOR UPLINK CONTROL SIGNALING WITH MASSIVE CARRIER AGGREGATION

(71) Applicant: TEXAS INSTRUMENTS INCORPORATED, Dallas, TX (US)

(72) Inventors: Anthony Edet Ekpenyong, Houston, TX (US); Ralf Matthias Bendlin, Plano, TX (US); Pierre Bertrand, Antibes (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 360 days.

(21) Appl. No.: 14/718,616

(22) Filed: May 21, 2015

(65) Prior Publication Data

US 2016/0192388 A1 Jun. 30, 2016

Related U.S. Application Data

(60) Provisional application No. 62/100,998, filed on Jan. 8, 2015, provisional application No. 62/098,944, filed on Dec. 31, 2014.

(51) Int. Cl.
*H04W 72/21* (2023.01)
*H04L 5/00* (2006.01)
(Continued)

(52) U.S. Cl.
CPC ........... *H04W 72/21* (2023.01); *H04L 1/1829* (2013.01); *H04L 5/001* (2013.01); *H04L 5/0053* (2013.01);
(Continued)

(58) Field of Classification Search
CPC ... H04W 76/00; H04W 76/02; H04W 76/025; H04W 72/0413; H04W 72/1284;
(Continued)

(56) References Cited

U.S. PATENT DOCUMENTS

2011/0243066 A1* 10/2011 Nayeb Nazar ........ H04L 1/0057
370/328
2012/0243505 A1* 9/2012 Lin ....................... H04L 5/0051
370/331
(Continued)

FOREIGN PATENT DOCUMENTS

WO 2011041623 7/2011
WO 2011112004 9/2011
(Continued)

OTHER PUBLICATIONS

Huawei et al. "Details of Reusing Dual Connectivity for PUCCH on SCell with CA", 3GPP TSG RAN WG1 Meeting #78, R1-142834, 3rd Generation Partnership Project (3GPP), Dresden, Germany, Aug. 18-22, 2014 (8 pages).
(Continued)

*Primary Examiner* — Ashley Shivers
(74) *Attorney, Agent, or Firm* — Gregory J. Albin; Frank D. Cimino (57) ABSTRACT

A method of operating a wireless communication system is disclosed. The method includes configuring a user equipment (UE) for carrier aggregation with N serving cells, where N is a positive integer. The UE is scheduled to receive downlink data from M of the N serving cells at a first time, where M is a positive integer less than or equal to N. The UE provides uplink control information (UCI) for only the M serving cells.

16 Claims, 8 Drawing Sheets

(51) Int. Cl.
  *H04L 1/1812* (2023.01)
  *H04L 1/1829* (2023.01)
  *H04L 1/00* (2006.01)

(52) U.S. Cl.
  CPC .......... *H04L 5/0092* (2013.01); *H04L 1/1812* (2013.01); *H04L 5/0098* (2013.01); *H04L 2001/0092* (2013.01)

(58) Field of Classification Search
  CPC ............... H04W 74/004; H04W 72/12; H04W 72/1263; H04W 72/1278; H04L 5/0035; H04L 1/1829; H04L 5/001; H04L 5/0053; H04L 5/0092; H04L 1/1812; H04L 5/0098; H04L 2001/0092
  See application file for complete search history.

(56) References Cited

U.S. PATENT DOCUMENTS

| | | | |
|---|---|---|---|
| 2012/0307760 A1* | 12/2012 | Han | H04L 5/001 370/329 |
| 2012/0320826 A1* | 12/2012 | Kim | H04L 1/1671 370/328 |
| 2013/0163532 A1* | 6/2013 | Anderson | H04W 72/04 370/329 |
| 2013/0208665 A1* | 8/2013 | Baldemair | H04L 1/1861 370/329 |
| 2013/0329691 A1* | 12/2013 | Kim | H04L 5/001 370/329 |
| 2014/0029533 A1 | 1/2014 | Han et al. | |
| 2014/0119246 A1* | 5/2014 | Yin | H04W 72/12 370/280 |
| 2014/0177527 A1* | 6/2014 | Lee | H04L 5/001 370/328 |
| 2014/0192738 A1 | 6/2014 | Nam et al. | |
| 2015/0124670 A1* | 5/2015 | Park | H04L 1/1671 370/281 |
| 2015/0156768 A1* | 6/2015 | Guan | H04W 72/0413 370/329 |
| 2015/0304915 A1* | 10/2015 | Uchino | G07C 9/00571 370/329 |
| 2015/0319753 A1* | 11/2015 | Chen | H04L 5/001 370/277 |
| 2015/0327230 A1* | 11/2015 | Takeda | H04L 1/1607 370/329 |
| 2016/0044655 A1* | 2/2016 | Park | H04W 72/1284 370/329 |
| 2016/0112994 A1* | 4/2016 | Wang | H04W 72/042 370/329 |
| 2016/0127107 A1* | 5/2016 | Zhang | H04L 5/001 370/329 |

FOREIGN PATENT DOCUMENTS

| | | |
|---|---|---|
| WO | 2012015154 | 2/2012 |
| WO | 2014157927 A1 | 10/2014 |

OTHER PUBLICATIONS

Supplementary European Search Report, Application No. 15876267.4, dated Nov. 13, 2018 (18 pages).
First Office Action dated Jul. 27, 2020, Chinese Application No. 2015800719027, 15 pages.
Second Office Action dated Mar. 24, 2021, Chinese Application No. 2015800719027, 15 pages.
"Design Considerations for Multi-Cell Periodic CSI Reporting," 3GPP TSG RAN WG1 #69, R1-122729, Texas Instruments, Prague, Czech Republic, May 21-16, 2012, 4 pages.
"PUCCH Support on a pSCell for CA," 3GPP TSG RAN WG1 #78, R1-143074, Samsung, Dresden, Germany, Aug. 18-22, 2014, 3 pages.
"Support of PUCCH on SCell for CA—RAN2 Aspects," 3GPP TSG RAN WG2 #86, R1-141967, NTT Docomo, Inc., Seoul, Korea, May 19-23, 2014, 10 pages.
"Support of PUCCH on SCell for CA—RAN2 Aspects," 3GPP TSG-RAN WG2 #87, R1-143073 (update to R1-141967), NTT Docomo, Inc., Dresden, Germany, Aug. 18-22, 2014, 10 pages.
Second Office Action dated Mar. 24, 2021, Chinese Application No. 201580071902.7, 25 pages.
Third Office Action dated Sep. 10, 2021, Chinese Application No. 201580071902.7, 29 pages.
"Large ACK/NACK Payload in Support of CA in TDD," 3GPP TSG RAN WG1 Meeting #62bis, R1-105455, ZTE, Xi'an, China, Oct. 11-15, 2010, 5 pages.
"Large ACK/NACK Payload in Support of CA in TDD," 3GPP TSG RAN WG1 Meeting #62bis, R1-105714, ZTE, Xi'an, China, Oct. 11-15, 2010, 6 pages.
Fourth Chinese Office Action dated Apr. 6, 2022, Chinese Application No. 2015800719027, 31 pages.

* cited by examiner

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

D - DOWNLINK (DL) SUBFRAME
U - UPLINK (UL) SUBFRAME
S - SPECIAL SUBFRAME

| UL/DL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7,6 | 4 | - | - | - | 7,6 | 4 | - |
| 2 | - | - | 8,7,4,6 | - | - | - | - | 8,7,4,6 | - | - |
| 3 | - | - | 7,6,11 | 6,5 | 5,4 | - | - | - | - | - |
| 4 | - | - | 12,8,7,11 | 6,5,4,7 | - | - | - | - | - | - |
| 5 | - | - | 13,12,9,8,7,5,4,11,6 | - | - | - | - | - | - | - |
| 6 | - | - | 7 | 7 | 5 | - | - | 7 | 7 | - |

| C31 | ∘∘∘ | C8 | C7 | C6 | C5 | C4 | C3 | C2 | C1 | R |
|---|---|---|---|---|---|---|---|---|---|---|
| 0 | ∘∘∘ | 0 | 1 | 1 | 0 | 0 | 1 | 0 | 1 | R |

7 CONFIGURED SCells

METHOD AND APPARATUS FOR UPLINK CONTROL SIGNALING WITH MASSIVE CARRIER AGGREGATION

This application claims the benefit under 35 U.S.C. § 119(e) of Provisional Appl. No. 62/098,944, filed Dec. 31, 2014 and to Provisional Appl. No. 62/100,998, filed Jan. 8, 2015, both of which are incorporated herein by reference in their entirety.

BACKGROUND OF THE INVENTION

The present embodiments relate to wireless communication systems and, more particularly, to transmission of Uplink Control Information (UCI) with massive Carrier Aggregation (CA).

Mobile video and data traffic is experiencing tremendous growth partly due to a shift from desktop computers to smartphones, tablets and machine-to-machine traffic. This has put a strain on wireless networks to cope with an increasing demand for higher data rates to satisfy user quality of experience. In addition, wireless traffic is not homogenous across any geographic area but is typically concentrated at hotspots such as coffee shops, shopping malls, airports, sports stadiums and office buildings. Several techniques have been adopted to increase data rates in fourth generation wireless networks such as the Third Generation Partnership (3GPP) Long Term Evolution-Advanced (LTE-A) system. One such technique is Carrier Aggregation (CA), where two or more RF component carriers are aggregated by a base station for transmission to and from a wireless terminal device. For example, LTE Releases 10-12 support aggregation of up to five RF component carriers (CCs). Thus, for a base component carrier bandwidth of 20 MHz, a single wireless terminal may support data rates on up to 100 MHz of RF spectrum.

Current mobile data trends show that much larger bandwidths may be required to satisfy cellular traffic needs in the near future. This was not foreseen at the time of specification of the LTE-A system in the 2008-2009 timeframe, where a maximum aggregation of 5 CCs was deemed to be sufficient well into the future. Just five years later 3GPP is specifying RF performance requirements to deploy 3 CCs in the downlink, and looking towards specifications for 4 CCs. As such it is necessary to consider much larger system bandwidths than are currently envisioned. Massive CA entails extending total bandwidths in excess of 100 MHz. A market driver for massive CA is the potential deployment of LTE in license-exempt spectrum such as 5 GHz. This would reduce the significant capital expenditure that is required to purchase additional licensed spectrum. For example, a primary component carrier may be operated in licensed spectrum and one or more secondary component carriers may be operated in the license-exempt spectrum. As large portions of license-exempt spectrum may be available for LTE operation, 3GPP may need to support more CCs for both downlink (DL) and uplink (UL) transmission.

In radio access networks such as LTE, uplink control information (UCI) may consist of Channel State Information (CSI), Scheduling Request (SR) or Hybrid Automatic Repeat Request Acknowledgement (HARQ-ACK). To enable HARQ operation at the Medium Access Control (MAC) layer, a wireless terminal may be configured to feedback to the base station a positive or negative acknowledgement in response to a DL packet that is detected in a transmission time interval (TTI). For Frequency Division Duplex (FDD) operation, HARQ-ACK feedback transmitted in an UL TTI corresponds to DL transmission in a previous TTI. For Time Division Duplex (TDD) operation, a single UL control packet may contain HARQ-ACK feedback corresponding to detected DL packets in one or more previous TTIs, since UL and DL share the same carrier.

The base station and wireless terminal operate respectively as a master-slave pair, wherein DL and UL transmission is configured or scheduled by the base station. Therefore, if the wireless terminal has data to transmit but has not been given an UL resource for transmission, the wireless terminal may send a scheduling request to the base station. A wireless terminal measures the DL CSI for a configured serving cell and reports back to its serving base station in an uplink channel. The CSI consists of one or more of channel quality indication, precoding matrix indication and rank indication. In turn, the base station may use the reported CSI to determine the optimal (in terms of spectral efficiency) precoding, modulation and coding rate for subsequent transmission to the wireless terminal.

In the LTE system, the base station is known as an Enhanced Node B (eNB) while the wireless terminal, which may be a tablet, mobile phone, PDA, PC, or USB dongle, is known as a User Equipment (UE). A subframe has a 1 ms duration, which is a TTI. There are 10 subframes within a 10 ms radio frame. UCI may be transmitted on the Physical Uplink Control Channel (PUCCH) or on the Physical Uplink Shared Channel (PUSCH). If a UE is not configured for simultaneous transmission on PUSCH and PUCCH, UCI may be transmitted on the PUCCH if the UE is not configured or scheduled to transmit on the PUSCH. Otherwise, if the UE is configured or scheduled to transmit on the PUSCH, UCI may be multiplexed with Uplink Shared Channel (UL-SCH) data on the PUSCH. Uplink transmission utilizes Single-Carrier Frequency Division Multiple Access (SC-FDMA), whereas the downlink utilizes Orthogonal Frequency Division Multiple Access (OFDMA).

Figure 1:
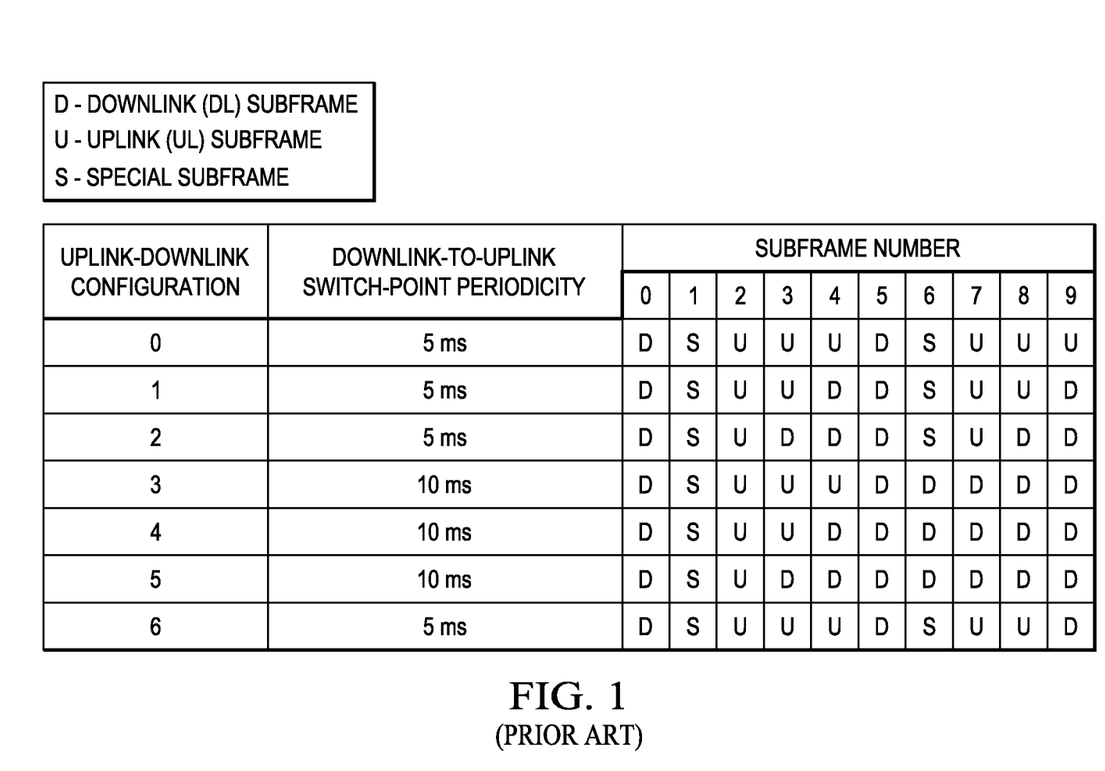
FIG. 1 is a diagram of downlink and uplink subframe configurations of the prior art.
Figure 4:
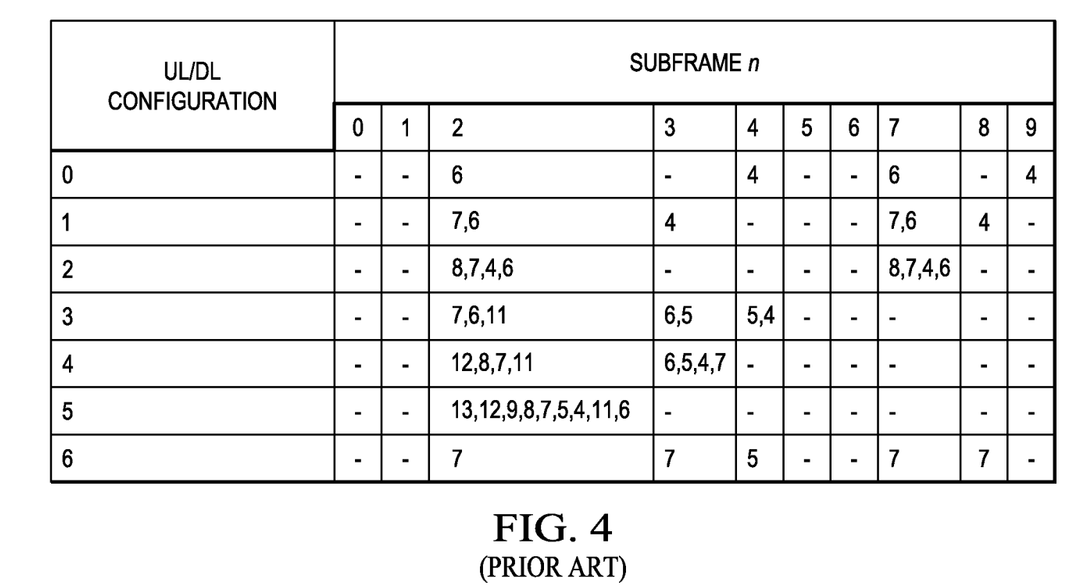
FIG. 4 is a diagram of the TDD downlink association set corresponding to the uplink/downlink subframe configurations of FIG. 1.

FIG. 1 shows LTE TDD UL/DL subframe configurations with different UL and DL allocations to support a diverse mix of UL and DL traffic ratios or to enable coexistence between different TDD wireless systems. For example, UL/DL Configuration 0 may provide 6 UL subframes. UL/DL Configuration 5 may provide 9 DL subframes including the special subframe. The set of DL subframes for which HARQ-ACK feedback is required in an UL subframe is denoted as the Downlink Association Set (DAS) for the UL subframe. For FDD, the size of the DAS is always 1. FIG. 4 depicts a LTE-TDD HARQ-ACK DL Association Set. Given a set of L elements, $\{k_0, k_1, \ldots, k_{L-1}\}$ the UE generates HARQ-ACK feedback in a UL subframe n corresponding to DL subframes $\{n-k_0, n-k_1, \ldots, n-k_{L-1}\}$. The Downlink Control Information (DCI) formats scheduling DL assignments or UL grants on a TDD serving cell contain a Downlink Assignment Index (DAI) field which indicates to the UE the number of DL subframes for which HARQ-ACK feedback is expected. For example, in an UL subframe n with a corresponding Downlink Association Set of size L subframes $\{n-k_0, n-k_1, \ldots, n-k_{L-1}\}$, the DAI field may indicate that fewer than L subframes were actually scheduled to the UE.

For CA operation, a UE may be configured with one or more secondary serving cells (SCells) in addition to the primary serving cell (PCell), which serves as the anchor for mobility procedures and connection to the Core Network. Each serving cell operates on a component carrier. The UE may only transmit UCI on the PUCCH of the PCell. The SCells are semi-statically configured by Radio Resource Control (RRC) signaling and are initially in a deactivation state when configured. A MAC layer control element is used by the eNB for fast activation and deactivation of a SCell.

LTE Release 12 supports UCI transmission of several PUCCH formats. Formats 1a and 1b respectively support transmission of 1 or 2 HARQ-ACK bits in a UCI payload. Format 1b with channel selection supports transmission of up to 4 HARQ-ACK bits, wherein a UE is configured with up to four PUCCH resources in an UL subframe. The selection of one out of these four PUCCH resources and QPSK modulation allows 16 possible HARQ-ACK combinations corresponding to multiple DL subframes or multiple DL serving cells. Format 1b with channel selection is used for either TDD with a single serving cell or for FDD and TDD with 2 DL serving cells. Format 2 is used for periodic CSI feedback for a single serving cell and supports up to 11 CSI bits in a UCI payload. Formats 2a and 2b may be used to support multiplexing of respectively 1 or 2-bit HARQ-ACK with CSI. Format 3 supports up to 11 bits using a single (32, 11) Reed-Muller (RM) encoder or up to 22 bits using two parallel (32, 11) RM (dual-RM) encoders. For the single RM encoder, the coded output is cyclically extended from 32 to 48 bits. For the dual-RM encoder, the output of each constituent (32, 11) encoder is truncated to 24 bits and then an interleaving operation is performed to map the two sets of coded bits across the two slots of a subframe. For FDD, the single RM encoder can support HARQ-ACK feedback for 5 serving cells (10 HARQ-ACK bits) and a single SR indication bit. For TDD, the dual RM encoder can support 5 serving cells and up to 4 DL subframes in a single UCI packet with 20 HARQ-ACK bits+1 SR bit. Furthermore, LTE Release 12 supports multiplexing a CSI packet of up to 11 bits with a HARQ-ACK+SR packet of up to 11 bits using PUCCH Format 3.

For LTE-TDD systems, a UE may need to transmit HARQ-ACK feedback for up to 9 DL subframes in a single UL subframe. Thus, for CA with 5 serving cells and transmission of 2 transport blocks (TBs) using MIMO spatial multiplexing, the potential maximum HARQ-ACK payload is 5*2*9=90 bits. To reduce the payload, LTE Release 12 CA specifies support for TDD UL/DL configurations where a maximum of 4 DL subframes need to be acknowledged in a single UL subframe for up to 5 serving cells. This is accomplished by performing a "bit AND" operation between the two HARQ-ACK bits associated with a scheduled DL transmission in one subframe (also known as spatial bundling). This spatial bundling operation reduces the maximum HARQ-ACK payload to (5*2*4)/2=20 bits for transmission using PUCCH Format 3. Due to this restriction on the number of DL subframes in the DL Association Set, only 2 serving cells may be aggregated using TDD UL/DL Configuration 5 in order to fully utilize the 22-bit maximum payload of PUCCH Format 3.

To support periodic CSI feedback for CA in LTE Releases 10-12, a UE may be configured with independent reporting configurations per configured serving cell. Collisions in reporting instances for different serving cells may be avoided by increasing the periodicity of the reporting occasions. However, such collisions may not be completely avoidable especially for some TDD UL/DL configurations and may lead to dropping of some CSI reports, which in turn may degrade DL throughput. On the other hand a UE may be scheduled by a Downlink Control Information (DCI) packet to transmit an aperiodic CSI report on the PUSCH. In contrast to the narrow bandwidths (1 Resource block pair) supported for PUCCH, PUSCH transmission allows a much larger UCI payload to be transmitted. Up to 68 CSI bits may be reported for a single CSI process in LTE Release 12.

Figure 2:
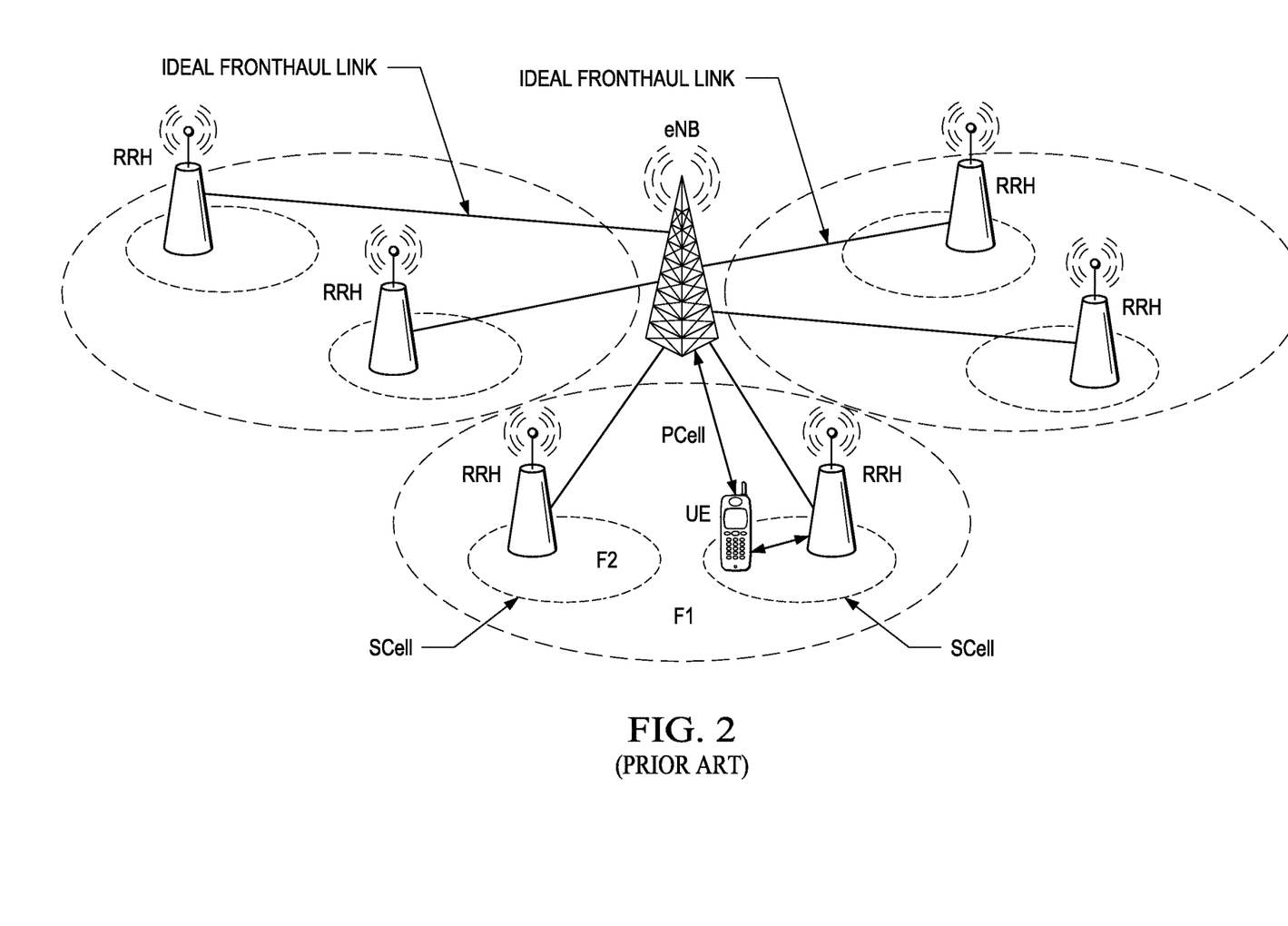
FIG. 2 is a diagram of a wireless communication system with a primary cell (PCell) and secondary cells (SCells) according to the prior art.

As a UE may only transmit on the PUCCH of its PCell, there may be deployment scenarios where the PUCCH on the PCell is overloaded. FIG. 2 illustrates a scenario where remote radio heads (RRH) are connected by an ideal link, such as a fiber optic cable, to a macro base station (eNB). In this illustration the PCell is operated on a lower frequency carrier F1 for macro coverage whereas the SCell is operated at a higher frequency carrier F2 to boost capacity at traffic hotspots within the macro cell area. Therefore, the PCell PUCCH may be overloaded, as all UEs share the same PCell, while the SCell PUCCH may be under-utilized. Furthermore, significant inter-cell UL interference may be observed as cell-edge UEs need high power when transmitting to the macro eNB.

Figure 3:
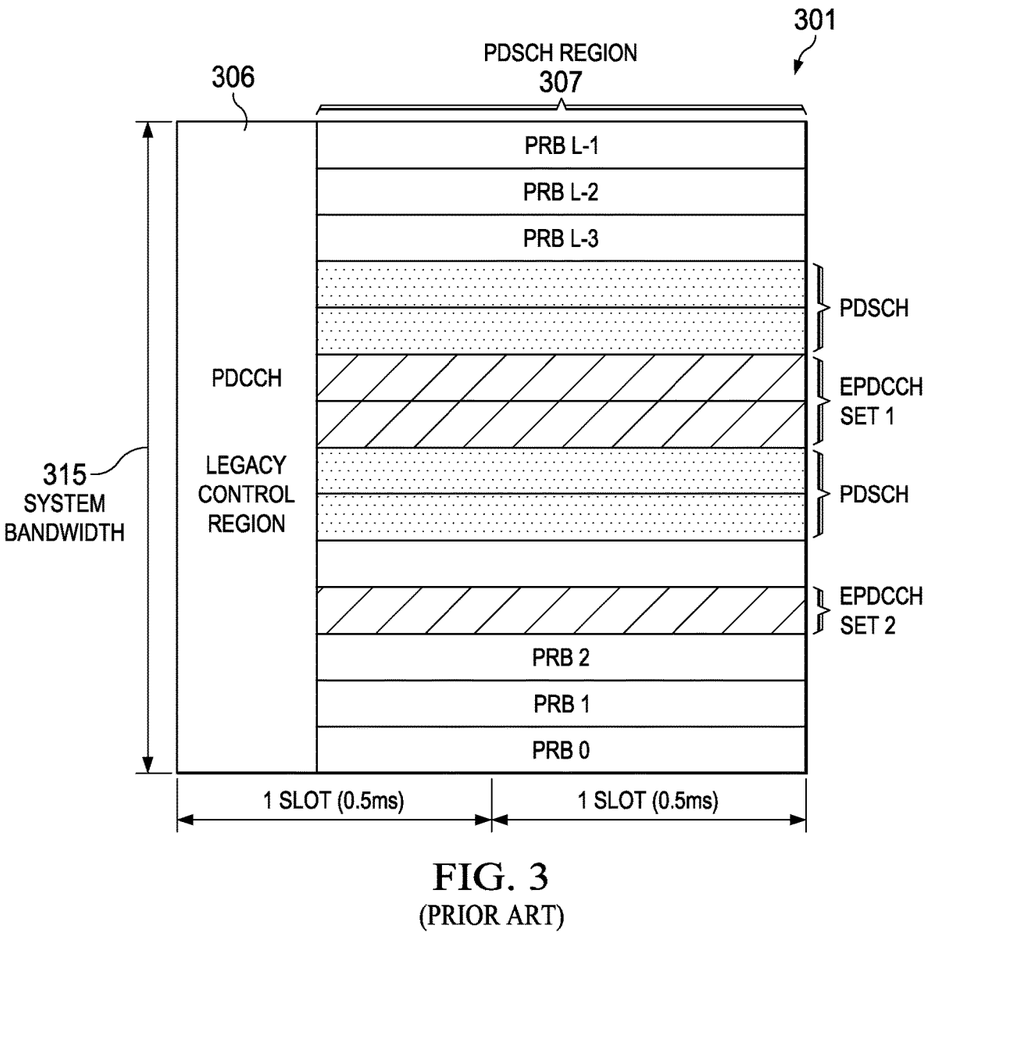
FIG. 3 is a diagram of an LTE downlink subframe of the prior art.

Referring now to FIG. 3, there is a diagram of a downlink LTE subframe 301. Each subframe comprises twelve OFDM symbols with Extended Cyclic Prefix (CP) or fourteen OFDM symbols with Normal Cyclic Prefix (CP) (306, 307). The system bandwidth 315 consists of a plurality of L Physical Resource Block (PRB) pairs, where each PRB in a pair is composed of twelve OFDM tones called sub-carriers and occupies a time slot of 0.5 ms. The PRB pair is the smallest time-frequency resource allocation unit in LTE, where data transmission to a user is scheduled on one or multiple PRB pairs. DL Shared Channel Data arrives at the Physical layer from the Medium Access Control (MAC) layer in the form of transport blocks, which are then mapped to PRB pairs according to a dynamically signaled resource allocation. Different PRB pairs in one subframe 301 are allocated for data transmission to different users. Furthermore, the set of PRB pairs on which a user receives downlink data transmission may change from one subframe to another.

In LTE, downlink control information is carried in a Downlink Control Information (DCI) format. A DCI is channel encoded, modulated, and transmitted in a specific physical transmission channel over an air interface. DCI formats are transmitted by the Physical Downlink Control Channel (PDCCH) or the Enhanced Physical Downlink Control Channel (EPDCCH). Referring to FIG. 3, a PDCCH is transmitted in a PDCCH region 306 of FIG. 3. As an additional physical resource for control information, the EPDCCH is transmitted in a subset of physical resource blocks (PRB) in the data region 307 and outside of the PDCCH control region 306. The eNB may configure plural EPDCCH sets in the downlink. Each EPDCCH set comprises a subset of PRB pairs which are semi-statically configured by radio resource control (RRC) signaling. For each UE, the configured EPDCCH set(s) may be orthogonal or partially overlapping. EPDCCH sets are configured in a UE-specific manner and could be identical or different for different UEs. Different DCI formats are used for different scheduling purposes. DCI can be used to transmit common control information to all users in a cell, UE-specific downlink control information to schedule PDSCH data transmission to a UE, or to schedule uplink data transmission from the UE to the eNB.

Resource allocation for UCI transmission on the PUCCH may be semi-statically configured by RRC signaling or dynamically signaled by a DCI format transmitted on the PDCCH or EPDCCH. Periodic CSI and Scheduling Request Indicators are transmitted on semi-statically configured resources. In contrast, the PUCCH resource for HARQ-ACK feedback is dynamically signaled by a control channel element of the PDCCH/EPDCCH for PUCCH Formats 1a/1b or by a HARQ-ACK resource indication in the PDCCH/EPDCCH, which is used to select one out of a set of semi-statically configured PUCCH resources e.g. for PUCCH Format 3.

As a greater number of CCs are aggregated for downlink transmission to a user equipment, a corresponding increase in uplink control signaling is required for efficient system operation. In the LTE Release 12 wireless system, for example, the uplink control signaling formats support a maximum of 5 DL CCs. The present inventors recognize that further improvements in uplink control signaling are needed to massively scale carrier aggregation beyond 100 MHz. Accordingly, embodiments of the present invention describe methods for transmitting uplink control information from a UE to its serving eNB when the said UE is configured for massive CA, which we define an aggregation of RF spectrum greater than 100 MHz.

BRIEF SUMMARY OF THE INVENTION

In a first embodiment of the present invention, there is disclosed a method of operating a wireless communication system. The method includes configuring a user equipment (UE) for carrier aggregation with N serving cells, where N is a positive integer. The UE is scheduled to communicate with M of the N serving cells at a first time, where M is a positive integer less than N. The UE provides Uplink Control Information (UCI) to only the M serving cells.

In a second embodiment of the present invention, there is disclosed a method of operating a wireless communication system. The method includes configuring a user equipment (UE) for carrier aggregation with N serving cells, where N is a positive integer. The N serving cells are partitioned into at least two groups. The UE transmits UCI for a first group of the at least two groups to a Primary Cell (PCell) of the first group. The UE transmits UCI for a second group of the at least two groups to a Secondary Cell (SCell) of the second group.

In a third embodiment of the present invention, there is disclosed a method of operating a wireless communication system. The method includes configuring a user equipment (UE) for carrier aggregation with N serving cells, where N is a positive integer. Methods and apparatus are disclosed for transmitting UCI corresponding to the N serving cells from a UE to an eNB.

DETAILED DESCRIPTION OF THE INVENTION

Some of the following abbreviations are used throughout the instant specification.
CCE: Control Channel Element
CQI: Channel Quality Indicator
CRS: Cell-specific Reference Signal
CSI: Channel State Information
CSI-RS: Channel State Information Reference Signal
DCI: DownLink Control Information
DFS: Dynamic Frequency Selection
DL: DownLink
DMRS: Demodulation Reference Signal
eNB: E-UTRAN Node B or base station or evolved Node B
EPDCCH: Enhanced Physical Downlink Control Channel
E-UTRAN: Evolved Universal Terrestrial Radio Access Network
FDD: Frequency Division Duplex
HARQ: Hybrid Automatic Repeat Request
LTE: Long Term Evolution
MAC: Medium Access Control
PDCCH: Physical Downlink Control Channel
PDSCH: Physical Downlink Shared Channel
PMI: Precoding Matrix Indicator
PRB: Physical Resource Block
PUCCH: Physical Uplink Control Channel
PUSCH: Physical Uplink Shared Channel
RE: Resource Element
RI: Rank Indicator
RNTI: Radio Network Temporary Identifier
RRC: Radio Resource Control
SNR: Signal to Noise Ratio
SR: Scheduling Request
SRS: Sounding Reference Signal
TB: Transport Block
TDD: Time Division Duplex
UCI: Uplink Control Information
UE: User Equipment
UL: UpLink A first step in the design is to determine the required number of UCI bits for massive CA. For FDD operation, one or two HARQ-ACK bits are required at the eNB when one or two respective transport blocks are transmitted on the PDSCH of a serving cell. Therefore, for N serving cells, 2*N HARQ-ACK bits are required. As an example, for N=32 serving cells, up to 64 HARQ-ACK bits are required. One way to reduce the number of bits is by spatial bundling across each serving cell to reduce the HARQ-ACK payload to N bits.

For TDD operation a larger payload is typically required, because there are limited UL subframes in which to transmit UL Shared Channel data or UCI. For a DL Association Set size of L subframes, the potential maximum HARQ-ACK payload for TDD CA is equal to N*2*L HARQ-ACK feedback bits when spatial multiplexing is configured on each of the N serving cells. For N=32 and L=9 DL subframes, this results in 32*2*9=576 bits. This is a significantly larger UCI payload than the 22 bits currently supported by PUCCH Format 3 in LTE Release 12. For TDD operation with a DL Association Set size of L=4, the total number of HARQ-ACK bits is 4 times the FDD HARQ-ACK payload.

If the total HARQ-ACK payload is larger than a UE's link budget can support, payload compression techniques can be used to reduce the payload size. One such technique is HARQ-ACK spatial bundling on each serving cell as previously described. For TDD operation and spatial bundling, N=32 serving cells, spatial multiplexing and L=4 DL subframes, the HARQ-ACK payload is equal to 128 bits. A different technique is time-domain bundling, wherein the UE performs a bit AND operation across the HARQ-ACK bits generated for the L DL subframes in the DL Association Set corresponding to an UL subframe. The HARQ-ACK payload may also be reduced by restricting the TDD UL/DL configurations that may be configured for a UE operating CA. For example, a UE may not be configured for massive CA of N serving cells, and L>4 on any configured serving cell. This operational restriction reduces the HARQ-ACK payload to at most N*2*4 bits without spatial bundling, or N*4 bits when spatial bundling is applied.

TDD-FDD carrier aggregation is also possible, where a UE is configured with at least one serving cell operating TDD and at least one serving cell operating FDD. The HARQ-ACK payload falls in between the FDD-only and TDD-only requirements.

A UE may be configured to measure and report CSI to the eNB in either a periodic or aperiodic fashion. Periodic CSI feedback is transmitted on the PUCCH of the primary serving cell. The current mechanism of independently configuring CSI reporting for each serving cell does not scale well as the number of configured cells, N, grows. This would lead to more collisions of CSI reports particularly for TDD operation. Similar, to HARQ-ACK feedback, a new PUCCH format may also be used for reporting CSI of multiple serving cells in an UL subframe. Aperiodic CSI feedback requirements also grow with N. For example, CSI feedback for N=32 CSI processes may require a maximum of 32*68=2176 bits transmitted on a single PUSCH.

Figure 5:
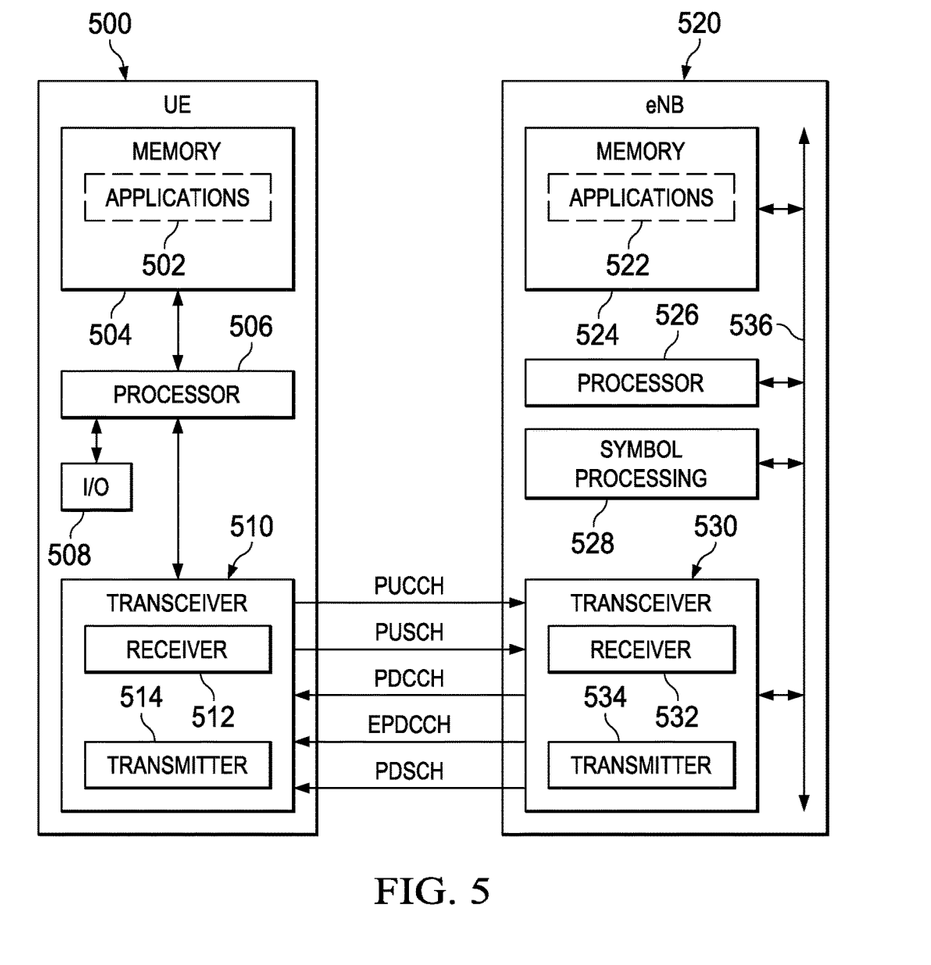
FIG. 5 is a block diagram showing operation of a user equipment and a representative base station according to the present invention.

Turning now to FIG. 5, there is a diagram showing communication between user equipment (UE) 500 and a base station (eNB) 520 according to the present invention. Here and in the following discussion, eNB 520 controls as many as N=32 separate serving cells for massive carrier aggregation (CA) at UE 500. Moreover, embodiments of the present invention may be extended to more than 32 serving cells as will be understood by those of ordinary skill in the art having access to the instant specification. UE 500 may be a cell phone, computer, or other wireless network device. UE 500 includes a processor 506 coupled to a memory 504 and a transceiver 510. Processor 506 may include several processors adapted to various operational tasks of the UE including signal processing and channel measurement and computation. The memory stores application software that the processor may execute as directed by the user as well as operating instructions for the UE. Processor 506 is also coupled to input/output (I/O) circuitry 508, which may include a microphone, speaker, display, and related software. Transceiver 510 includes receiver 512 and transmitter 514, suitable for wireless communication with eNB 520. Transceiver 510 typically communicates with eNB 520 over various communication channels. For example, transceiver 510 sends uplink information to eNB 520 over physical uplink control channel PUCCH and physical uplink shared channel PUSCH. Correspondingly, transceiver 510 receives downlink information from eNB 520 over physical downlink control channel PDCCH, enhanced physical downlink control channel EPDCCH, and physical downlink shared channel PDSCH.

Base station 520 includes a processor 526 coupled to a memory 524, a symbol processing circuit 528, and a transceiver 530 via bus 536. Processor 526 and symbol processing circuit 528 may include several processors adapted to various operational tasks including signal processing and channel measurement and computation. The memory stores application software that the processor may execute for specific users as well as operating instructions for eNB 520. Transceiver 530 includes receiver 532 and transmitter 534, suitable for wireless communication with UE 500. Transceiver 530 typically communicates with UE 500 over various communication channels. For example, transceiver 530 sends downlink information to UE 500 over physical downlink control channel PDCCH, enhanced physical downlink control channel EPDCCH, and physical downlink shared channel PDSCH. Correspondingly, transceiver 530 receives uplink information from UE 500 over physical uplink control channel PUCCH and physical uplink shared channel PUSCH.

Once communication is established with eNB 520, transceiver 510 receives one or more DL assignments on the PDCCH or EPDCCH in a DL subframe scheduling DL data transmission on one or more serving cells. After processing the DL data, transceiver 510 generates HARQ-ACK feedback for up to N configured serving cells and transmits on the PUCCH in a subsequent UL subframe. According to the present invention, a CSI report may contain CSI measurements for two or more serving cells. For CSI measurement, transceiver 510 uses the CRS or CSI-RS transmitted in one or more of the DL subframes to create a CSI measurement report that is transmitted to eNB 520 in a subsequent UL subframe. According to the present invention, a CSI report may contain CSI measurements for two or more serving cells.

Restricted PUCCH Feedback

A UE's processing capability, as determined by its cost and complexity, may limit the number of DL transport blocks that may be received in a DL subframe. Similarly, CSI feedback in a single UL subframe is limited by the UE's CSI measurement capability. Hence, even if a UE is configured with up to 32 DL serving cells, for example, it is possible that only a fraction of these serving cells may be scheduled in a subframe or a sequence of subframes such as the TDD DL Association Set. In the license-exempt spectrum a UE may be configured with a large number of serving cells but a majority of these cells may be flexibly activated or deactivated by the network to satisfy coexistence requirements with other technologies such as WiFi. Other use cases for flexible activation/deactivation include energy savings and interference management considerations. Furthermore, scalable solutions are desirable where the maximum number of configured serving cells is less than 32.

An embodiment of the present invention strives to reuse legacy PUCCH formats for massive CA taking into account UE processing capability. A UE may be configured by RRC signaling for CA operation with N serving cells where N is less than or equal to 32 and the configured serving cells are indexed from 0 to N−1. The PCell is assigned the serving cell index 0, while the configured SCells are assigned indexes from 1 to N−1. In a specific time period, the UE may only be scheduled on a subset M of the N serving cells. To reuse legacy PUCCH formats, M is preferably less than or equal to 5. A UE configured for CA operation is configured to only monitor the PDCCH and/or EPDCCH on activated serving cells or to monitor the PDCCH and/or EPDCCH on a different serving cell for PDSCH transmission on an activated serving cell. The UE transmits HARQ-ACK feedback only for activated serving cells. This is different from LTE Release 12 where the UE transmits HARQ-ACK feedback for all configured serving cells. An ambiguity problem may arise during a time period spanning when the eNB transmits a SCell activation/deactivation signal to a UE and the time instance when the UE applies the received SCell activation/deactivation signal to the set of configured serving cells. During this time period the eNB and the UE may not have the same understanding as to which serving cells are currently active. This may lead to confusion in the mapping of HARQ-ACK feedback to activated serving cells. According to the present invention, therefore, the eNB may not schedule the UE on a SCell during an activation/deactivation period. The eNB may also use a positive HARQ-ACK feedback in response to the PDSCH containing the MAC layer activation/deactivation signal to determine that the UE correctly received the activation command. As one example of this embodiment for FDD, an activation/deactivation MAC control element detected in a subframe n requires HARQ-ACK feedback in subframe n+4. The UE may start generating HARQ-ACK feedback for a newly activated SCell in a later subframe such as n+8.

The activation/deactivation command may be transmitted in a MAC control element with a length of 4 octets (32 bits) corresponding to serving cell index C1 through C31 for the possible SCells (the PCell index is C0 and it is always active). The UE may disregard the activation/deactivation MAC control element if more than M cells are activated (i.e. more than M fields of the MAC control element are set to '1'). Alternatively it may disregard control element fields for more than M cells. The size of the MAC control element is determined by the maximum number of SCells that may be configured for a UE. For example, if the maximum number is 16, the MAC control element may have a length of 2 octets (16 bits).

Figure 6:
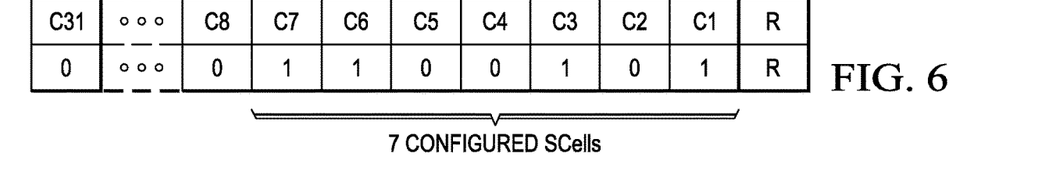
FIG. 6 is a diagram showing selective activation of configured SCells.

In one example of this embodiment, N=8, M=5 and the UE is configured for spatial multiplexing on each cell and HARQ-ACK feedback using PUCCH Format 3. FIG. 6 shows the activation/deactivation MAC control element consisting of four octets, where SCells with indices C1, C3, C6 and C7 are activated. For N=8, the fields C8 through C31 are not used. The UE maps the HARQ-ACK feedback bits in increasing order of the activated serving cells. At a subsequent time, the eNB may activate the SCells, C4, C5, C6, C7 and deactivate cells C1, C2 and C3, i.e. [C0-TB0, C0-TB1, C1-TB0, C1-TB1, C3-TB0, C3-TB1, C6-TB0, C6-TB1, C7-TB0, C7-TB1]. The UE then maps HARQ-ACK feedback bits in the following order [C0-TB0, C0-TB1, C4-TB0, C4-TB1, C5-TB0, C5-TB1, C6-TB0, C6-TB1, C7-TB0, C7-TB1].

The restriction that M is less than or equal to 5 is so that legacy PUCCH formats may be reused. However, the present embodiment is applicable to PUCCH formats that may support more than 5 configured serving cells or equivalently a UCI payload of more than 22 bits, as the main feature of this embodiment is that the HARQ-ACK feedback is limited to the activated serving cells.

An alternative embodiment of the present invention is to dynamically signal to the UE a subset M (M is less than or equal to N) of configured cells that require HARQ-ACK feedback. In a new DCI format the payload contains a HARQ-ACK indication bitmap with a length that is either equal to the number of configured SCells or is set to the maximum number of SCells. A bit value of '1' or '0' respectively indicates HARQ-ACK is required or not required for the SCell mapped to the bit location. In one embodiment of the present invention the DCI format only contains the HARQ-ACK indication bitmap to signal the active set of serving cells requiring HARQ-ACK feedback. In a second embodiment of the invention, the HARQ-ACK indication bitmap is multiplexed with DL scheduling information in a single DCI format. To further reduce the DL control overhead, the HARQ-ACK indication in a DCI format may be configured for a group of UEs configured with the same SCells. If UE-specific signaling is used, the CRC of the DCI payload is scrambled with the Cell Radio Network Temporary Identifier (C-RNTI), whereas if the dynamic signaling targets a group of UEs, the CRC of the DCI payload is scrambled with a group-specific RNTI that is either configured by RRC signaling or is a fixed value such as from the hexadecimal range FFF4-FFFC.

The dynamic signaling indication for required HARQ-ACK feedback may be transmitted at fixed time intervals based on a signaling configuration that is signaled to the UE by the eNB. This signaling structure takes advantage of the use case where only a subset of the configured serving cells may be scheduled within a fixed time period. An additional advantage of periodic signaling is the reduced DL control overhead.

Other dynamic signaling schemes for indicating the serving cells requiring HARQ-ACK feedback are not precluded such as grouping SCells and using a combinatorial index to select a group. In one embodiment, the serving cells for a UE are configured into HARQ-ACK groups and a HARQ-ACK bit field of length equal to the number of HARQ-ACK groups is inserted in the DL DCI formats scheduling DL data to a UE. A bit value of '1' at a bit location indicates to the UE that HARQ-ACK feedback is required for the group of serving cells corresponding to the said bit location in the HARQ-ACK field. Only one bit can be set to '1' in the HARQ-ACK group indication field. This signaling mechanism may be used in scenarios where a UE is configured with a large number of CCs, which are grouped into subbands. For example, LTE operation in an unlicensed band or a band with an incumbent primary user may need to obey regulatory requirements such as Dynamic Frequency Selection. The eNB may perform a sensing operation within the band to determine a suitable carrier or group of carriers for data transmission in a fixed time period determined by the sensing duty cycle. The UE is configured by RRC signaling with these carrier groups. Dynamic signaling in a DCI format then indicates to the UE which carrier group to generate HARQ-ACK feedback. For carrier groups containing at most 5 CCs, the UE is configured for PUCCH Format 3 transmission.

PUCCH Group Configuration

Figure 7:
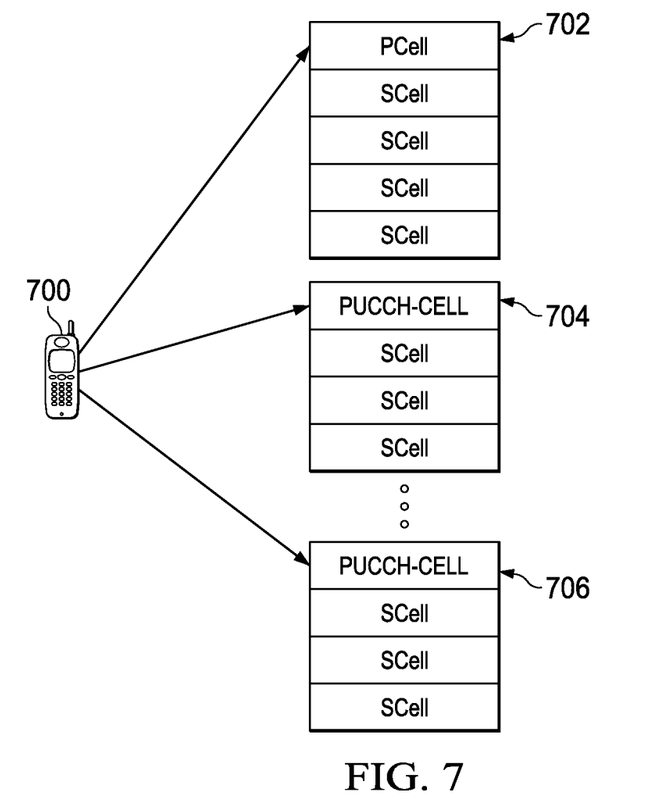
FIG. 7 is a diagram showing operation of an SCell as a PUCCH-cell in a group of SCells.

Referring to FIG. 7, the Dual Connectivity feature of PUCCH transmission to two independent eNBs may be extended to massive CA as follows. The configured serving cells for a UE 700 may be partitioned in to two or more PUCCH groups (704, 706). In each PUCCH group, one serving cell, denoted a PUCCH-cell, is configured for PUCCH transmission corresponding to UCI feedback for serving cells assigned to the PUCCH group. For the PUCCH group containing the PCell 702, UCI is transmitted on the PUCCH of the PCell. For other PUCCH groups (704, 706), the UE is configured by RRC signaling with a SCell as the PUCCH-cell. DL or UL data transmission on a PUCCH-cell may not be scheduled by the PDCCH or EPDCCH on a different serving cell.

In one embodiment of the invention, UCI transmission on PUCCH and PUSCH is per PUCCH group. Specifically, UCI for a serving cell within a PUCCH group may only be transmitted on PUCCH and/or PUSCH in a serving cell in this same PUCCH group. Secondly, the operation of simultaneous transmission of PUCCH/PUSCH is configured per PUCCH group and according to UE capability for supporting PUCCH/PUSCH transmission in the frequency bands of said PUCCH group. If a UE scheduled to transmit on PUSCH in a configured serving cell of a PUCCH group, is not configured for simultaneous PUCCH/PUSCH transmission and has to transmit UCI for same PUCCH group, the UE multiplexes UCI and UL-SCH data on the PUSCH.

In a separate embodiment, in case of a power limitation preventing parallel transmission of PUCCH and PUSCH across two or more PUCCH groups, the UE may transmit all UCI on the scheduled PUSCH without regard to which group the UCI belongs to. This advantageously avoids a need to drop UCI in a PUCCH group due to power limitation. The eNB may schedule an UL resource allocation that supports reliable reception quality for a large UCI payload. A UE may be independently configured with a PUCCH format for HARQ-ACK transmission in each PUCCH group.

To support up to 32 CCs using the current PUCCH formats, up to CEILING (32/5)=7 PUCCH groups would be required assuming PUCCH Format 3 is configured for each group. This may not be desirable from the perspective of UL power control because as the number of PUCCH groups increases, there is a greater likelihood that the total desired UL power exceeds the UE's UL power capability if the UE is scheduled across PUCCH groups within the Downlink Association Set. Therefore, it may be preferable to limit the PUCCH group size to at most 8 serving cells. For FDD this approach reduces the maximum HARQ-ACK payload to 8 cells*2 TBs=16 bits and allows reuse of PUCCH Format 3 transmission for each PUCCH group. However, for TDD the maximum HARQ-ACK payload may be up to 8 cells*2 TBs*4 DL subframes=64 bits if the maximum length of the DL Association Set is 4. Even with spatial bundling this only reduces the HARQ-ACK payload to 32 bits, which is still much larger than the capacity of PUCCH Format 3. Therefore, enhanced solutions are necessary for TDD. One solution is to perform a bit AND operation across DL subframes in the DL Association Set. For example, for a length-4 DL Association Set and spatial multiplexing on all configured serving cells, the HARQ-ACK payload reduces to 8 cells*2 TBs=16 bits. Other bit AND operations are not precluded. For example, in another embodiment, a bit AND operation is performed across HARQ-ACK feedback for two TBs in up to 2 consecutive DL subframes in the DL Association Set. For a length-4 DL Association Set this results in a total payload of 8 cells*2=16 bits.

To maintain backward compatibility a scheduling request may only be transmitted on the PCell. In an alternative embodiment scheduling requests may be transmitted on any configured PUCCH.

PUCCH resource allocation may be handled per PUCCH group. For example, in FDD if the UE detects a PDSCH only for the PUCCH-cell in a PUCCH group in a given subframe, PUCCH Format 1a/1b is used for HARQ-ACK feedback. Otherwise, if a PDSCH is detected on any other SCell within a PUCCH group, a larger payload PUCCH format (e.g. PUCCH Format 1b with channel selection or PUCCH Format 3) is used for HARQ-ACK transmission.

In case the UE is required to simultaneously transmit on PUCCH in multiple PUCCH groups in a same subframe and there is a power limitation, a prioritization of PUCCH transmission is necessary. In this case the PUCCH on PCell has the highest priority. For more than one PUCCH-cell, equal priority may be assigned to PUCCH-cells on SCells. Alternatively, priority may depend on the UCI information type that is transmitted, where HARQ-ACK/SR has higher priority than CSI.

If a PUCCH group not containing the PCell and the associated PUCCH-cell are configured by RRC signaling, a problem may arise if the PUCCH-cell is deactivated by a MAC activation/deactivation control element as there is no PUCCH to convey UCI for other SCells in the PUCCH group. Accordingly, a SCell configured as the PUCCH-cell may not be deactivated unless all other SCells in the PUCCH group are also deactivated. Consequently, the UE may assume that a detected MAC control element containing an activation/deactivation command for a PUCCH-cell implicitly deactivates all other SCells in the PUCCH group. An alternative embodiment is to introduce a MAC control element for faster reconfiguration of the PUCCH-cell. The PUCCH group may be changed by RRC reconfiguration.

Transmit power control (TPC) for PUCCH transmission may be enabled by the eNB transmitting a TPC command in a DCI packet scheduling PDSCH in a serving cell of a PUCCH group. To reduce the DL control overhead, group power control commands are also supported in LTE, wherein independent TPC commands for a group of UEs are multiplexed into DCI format 3/3A. Since DCI format 3/3A contains control information that is common to multiple UEs, it is transmitted in the common search space. To support group power control commands in a PUCCH group, a UE may be configured to monitor the common search space on a configured PUCCH-cell. A drawback of this approach is that it may not scale well in terms of UE complexity as the number of PUCCH groups increases since the UE has to perform 12 blind decoding operations for each monitored common search space. Moreover, it is not backward compatible with CA operation in LTE Release 12. Thus, a UE is preferably not configured to monitor a common search space on a SCell.

Multi-Resource Configuration

For massive CA it may be desirable to support larger UCI payloads on the PUCCH of one serving cell. One example is cross-carrier scheduling of DL transmission in a first serving cell from a control channel of a second serving cell in heterogeneous network (Het-Net) deployments. Several methods of utilizing multiple PUCCH resources for UCI transmission on PUCCH according to the present invention will now be described in detail.

Figure 8:
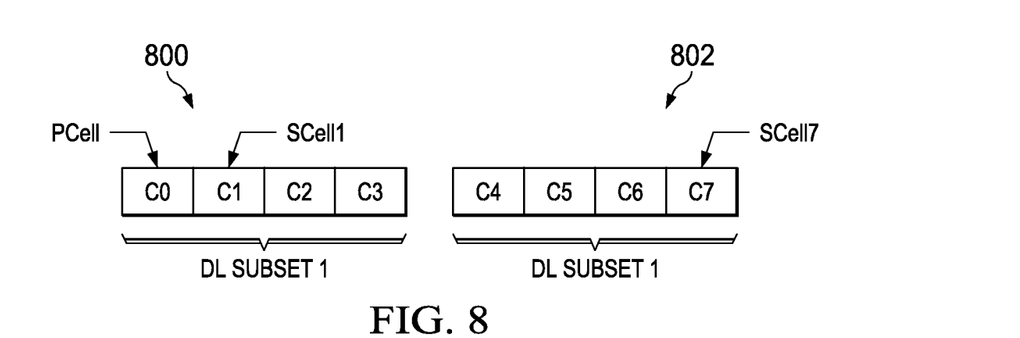
FIG. 8 is a diagram showing grouping of serving cells into PUCCH resource-specific DL subsets.

In one embodiment of this invention a set of serving cells configured for a UE is partitioned into one or more PUCCH-resource-specific DL subsets. FIG. 8 shows a CA configuration with 7 SCells. SCells indexed from 1 through 3 are grouped with a PCell in a first DL Subset 800. SCells indexed from 4 through 7 are grouped into a second DL Subset 802.

The serving eNB configures one or more PUCCH resources for each subset. For any DL subframe within a Downlink Association Set, the eNB schedules PDSCH transmissions only on serving cells within a particular DL subset. The UE selects a PUCCH resource based on the DL subset where PDSCH transmissions are detected. This may also include a DCI indicating release of a Semi-Persistent Scheduling (SPS) resource. A configured SCell may only belong to one DL subset. An advantage of this embodiment is that it may reuse legacy LTE PUCCH formats such as PUCCH Format 3 and PUCCH Format 1b with channel selection. The resource allocation method may also reuse legacy methods. For each DL subset a UE may be configured with a set of two or more PUCCH resources. The selection of a resource from this set is determined by a HARQ-ACK resource indication field in a PDCCH or EPDCCH scheduling DL transmission or indicating SPS release. However, there may be significant uplink control overhead with this method. For example, with 4 DL subsets and PUCCH Format 3 transmission, the UE may be configured with a set of 4 PUCCH resources for each DL subset totaling 16 PUCCH resources. An alternative mechanism is to configure the UE by RRC signaling with a fixed PUCCH resource for each DL subset.

This method of configuring DL subsets limits the scheduling flexibility at the eNB, since the eNB is constrained to schedule DL transmission within the serving cells of one DL subset. The limitation imposed by this restricted scheduling may be alleviated by configuring a UE to simultaneously transmit on multiple PUCCH resources in a subframe. For example, with PUCCH Format 3 and at most 32 UCI bits, a UE may be configured to simultaneously transmit on CEILING(32/22)=2 PUCCH resources in an UL subframe, where each PUCCH resource is used to transmit UCI for a DL subset of serving cells.

In another embodiment of this invention the configuration of HARQ-ACK feedback only for activated SCells is combined with the concept of SCell grouping into DL subsets. To avoid ambiguity between the eNB and UE on which SCells are activated, a Subset Indication field is added to the UCI payload. Each value of the Subset Indication field indicates a DL subset for which one or more PDSCHs were detected within a DL Association Set. The eNB is not expected to schedule across DL subsets within a DL Association Set. Therefore, the detected Subset Indication value in the UCI payload indicates to the eNB which DL subset was received by the UE. In one exemplary embodiment of 2 DL subsets as shown in FIG. 8, a 1-bit Subset Indication field may be appended to the UCI payload of PUCCH Format 3 in addition to up to 21 HARQ-ACK+SR bits. Bit values '0' and '1' may respectively indicate HARQ-ACK feedback for DL Subsets 800 and 802.

Addition of a Subset Indication field may also be applicable to UCI transmission on PUSCH. For example, the Subset Indication field may be a bit map with length equal to the number of configured serving cells and where each bit indicates whether there is UCI feedback for a specific configured serving cell.

Since the PCell serves as the anchor cell for mobility and the UE's connection to the Core Network, it may be desired to schedule the PCell in any valid DL subframe. Thus, PCell scheduling is not restricted to a single DL subset. An embodiment of this invention is to partition only the SCells into DL subsets. For a PDSCH detected on a SCell in a DL subset, the UE generates HARQ-ACK feedback for the PCell and all SCells in the DL subset and arranges the generated HARQ-ACK bits in increasing order of the serving cell index. For the case of N−1 configured SCells, PUCCH Format 3 is configured for each DL subset. A total of CEILING{(N−1)/4} DL subsets is required for FDD operation since a single PUCCH Format 3 transmission can support the PCell plus up to 4 SCells.

New PUCCH Formats

A new PUCCH format according to one embodiment of the present invention supports a much larger UCI payload than a legacy PUCCH Format 3. In the following discussion this new format is denoted PUCCH Format 4. For the same PUCCH performance as in legacy LTE systems, a larger payload implies a larger control overhead. More specifically, the UCI payload size may be traded off against either multiplexing capacity (number of UEs transmitting in a single PRB pair) or a larger PUCCH bandwidth. The following discussion addresses design tradeoffs for UCI signaling with these methods.

Method 1

PUCCH Format 3 trades off multiplexing capacity for increased payload. Specifically, a spreading factor (SF) of 5 allows multiplexing of up to 5 UEs each performing 1-Tx transmission, or 2 UEs each performing 2-Tx transmission in a single PRB pair.

Figure 9:
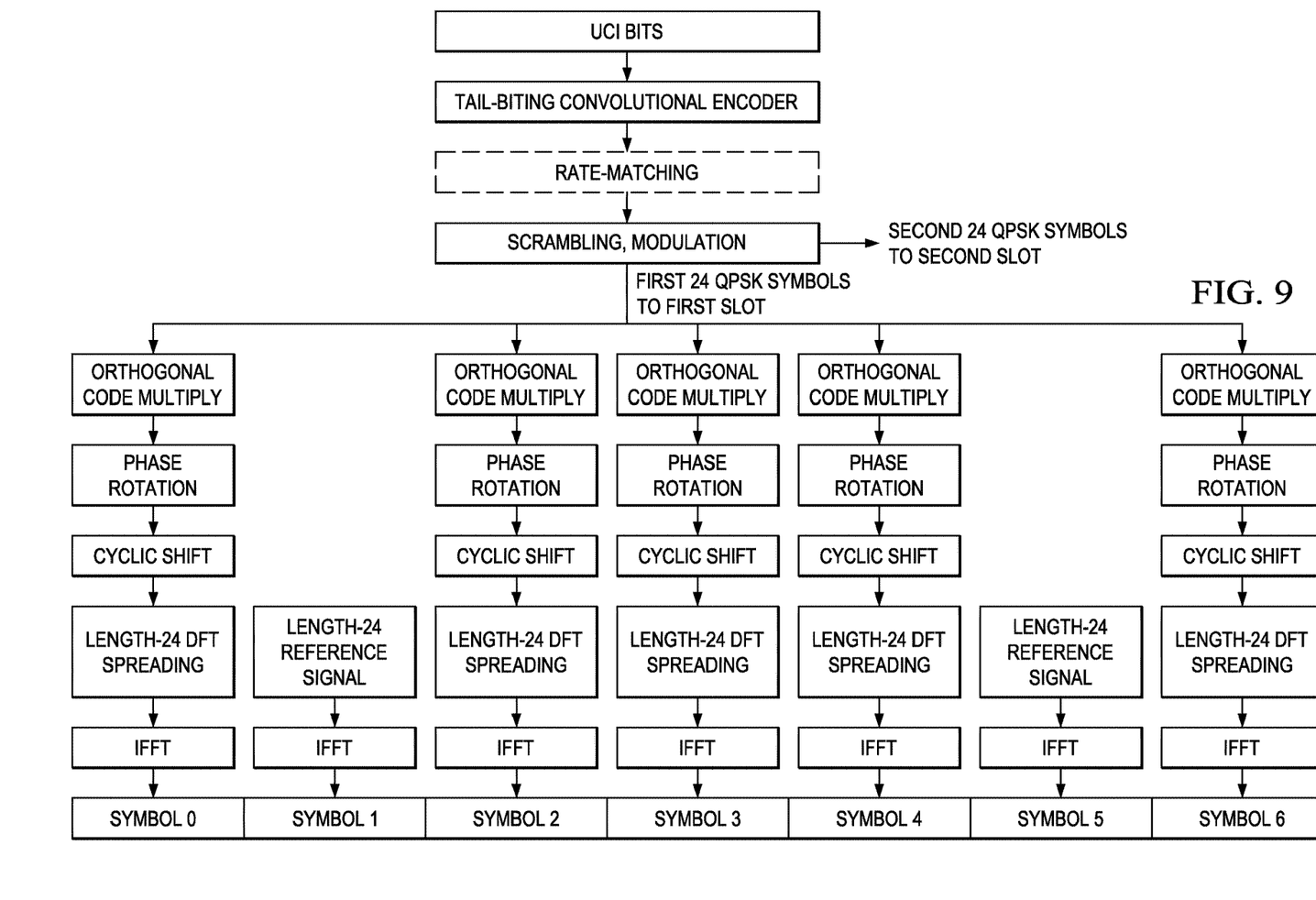
FIG. 9 is a block diagram of a new PUCCH format according to the present invention.

UCI payload may be increased by employing a larger PUCCH bandwidth of 2 PRB pairs. The PUCCH Format 3 design with SF=5 offers 48 coded bits by employing 1 PRB in each slot of a subframe. For a maximum 22-bit payload this translates to an effective coding rate of 0.46 (22/48). Extending to 2 PRBs in each slot doubles the information payload for the same coding rate. Assuming a maximum 32-bit payload, the effective coding rate is 32/96=0.33, which should provide improved performance compared to PUCCH Format 3. For this larger payload size, a code rate 1/3 tail-biting convolutional encoder may be employed. FIG. 9 illustrates an exemplary embodiment of the new PUCCH Format 4 where the UCI bits (e.g. HARQ-ACK+SR) are first encoded with a rate-1/3 tail-biting convolutional encoder. The rate-matching block is optional and may be added if repetition or puncturing is needed to produce 96 coded bits. Then the coded bit sequence is scrambled, and QPSK-modulated to generate 48 QPSK symbols. The first 24 QPSK symbols are mapped to 2 PRBs in the first slot while the second 24 QPSK symbols are mapped to 2 PRBs in the second slot of a subframe. Similar to Format 3, an orthogonal code of length 5 is applied to each sequence of 24 QPSK symbols and the output is mapped to five data SC-FDMA symbols of the slot when normal cyclic prefix is used. Phase rotation and cyclic shift within an SC-FDMA symbol are performed to randomize intra- and inter-cell interference. The phase rotation sequence may be same as PUCCH Format 3. The cyclic shift is also similar to PUCCH Format 3, but it is a pseudo-random shuffling of the length-24 QPSK sequence modulo 24. For example, $\tilde{y}(i)=y((i+n_{cs}^{cell}(n_s,l))$ mod 24), where $y(\cdot)$, $\tilde{y}(\cdot)$ are the input and output sequences respectively, and $n_{cs}^{cell}(n_s,l)$ a pseudo-random sequence that is a function of the slot number $n_s$ within a radio frame and the symbol number l within the slot. In contrast to PUCCH Format 3, a length-24 DFT spreading is performed before the IFFT operation. Similarly, a length-24 reference signal (RS) is generated and mapped to the RS symbols.

Increasing the PUCCH bandwidth may also increase the link budget requirements. As a result, fewer UEs in a macro cell area may be configured for this PUCCH format. On the other hand, the PUCCH receiver performance may still be acceptable as the eNB receiver may take advantage at the decoder of the fact that a negative acknowledgement (NAK) is generated for some of the DL cells.

Similar to PUCCH Format 3 transmission, a UE may be configured by RRC signaling with a set of four PUCCH resources. The eNB dynamically signals an indication of which of these four resources, denoted as $n_{4,PUCCH}$, is used in an UL subframe. This may be accomplished by a HARQ- ACK resource indicator transmitted in the Transmit Power Control field of the DCI containing a DL assignment for a SCell. In contrast to PUCCH Format 3, however, the UE maps the UCI payload to two contiguous PRBs. As an alternative the payload may be mapped to one PRB each at each edge of the system bandwidth but this may increase the out-of-band emissions. Since two PRBs are assigned for this new PUCCH Format 4, the total number of PUCCH resources within a system bandwidth of 110 PRBs is 110*5/2=275 for SF=5.

Figure 10:
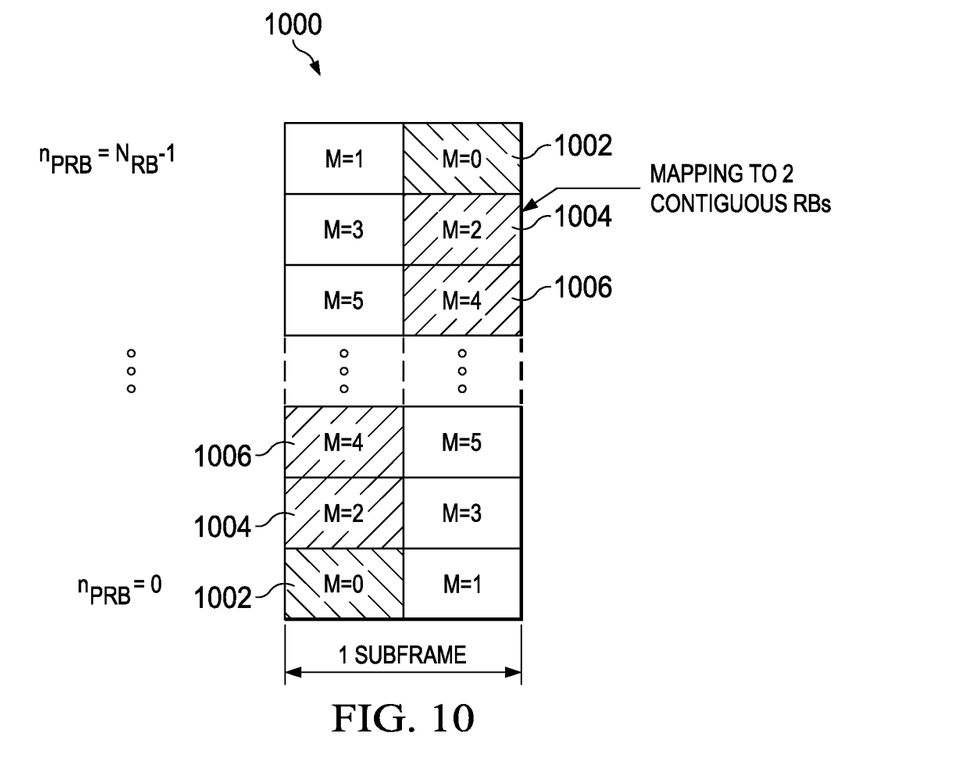
FIG. 10 is a diagram showing mapping of two contiguous physical resource blocks (PRBs) for PUCCH transmission according to the present invention.

Referring next to FIG. 10, a mapping of the PUCCH resource to UL system bandwidth 1000 is shown for a subframe containing a PUCCH transmission. The UL system bandwidth consists of $N_{RB}^{UL}$ RBs in each slot of the subframe. The dynamically signaled PUCCH resource is mapped to two contiguous logical RBs 1004 and 1006 in each slot of a subframe. Frequency hopping is applied across the two slots of the subframe for logical RB indexes 1004 and 1006. The UE maps the DFT-spread sequence and UL Demodulation Reference Signal (DMRS) to logical RB indices m=2, 4. In contrast, legacy PUCCH formats are mapped to a single RB pair in each slot of the subframe, such as RB 1002.

The set of PUCCH resources (denoted $n_{4,PUCCH}$) may be RRC signaled from the set [0, 549] to support system bandwidths up to 110 RBs and the PUCCH resource-to-logical RB mapping is $m=\text{floor}\{n_{4,PUCCH}/5\}$. The logical-to-physical RB mapping for the pair of PRBs is as follows, where $n_{PRB,0}$, $n_{PRB,1}$ are respectively the PRB indexes in slots 0 and 1 of the subframe.

$$n_{PRB,0} = \begin{cases} \lfloor \frac{m}{2} \rfloor & \text{if } (m + n_s \bmod 2) \bmod 2 = 0 \\ N_{RB}^{UL} - 1 - \lfloor \frac{m}{2} \rfloor & \text{if } (m + n_s \bmod 2) \bmod 2 = 1 \end{cases}$$

$$n_{PRB,1} = \begin{cases} n_{PRB,0} + 1 & \text{if } (m + n_s \bmod 2) \bmod 2 = 0 \\ n_{PRB,0} - 1 & \text{if } (m + n_s \bmod 2) \bmod 2 = 1 \end{cases}$$

It is up to the eNB to ensure that there is no collision between resources assigned to PUCCH Format 4 and resources assigned to other PUCCH formats. Furthermore, the eNB may select a PUCCH resource to ensure that the two contiguous PRBs are located in the same half of the system bandwidth.

Method 2

Figure 11:
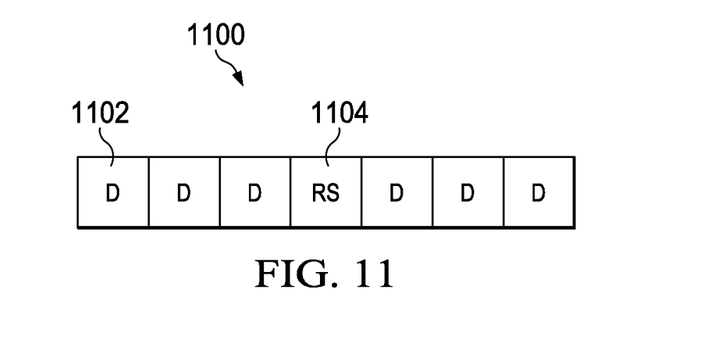
FIG. 11 is a diagram showing a mapping of UCI data and a demodulation reference signal to the symbols of a physical resource block.

A different solution that trades off multiplexing capacity with UCI payload (or equivalently effective coding rate) is to reduce the spreading factor. The extreme case of SF=1 may translate to PUSCH-type transmission on 1 PRB per slot since only 1 UE occupies the PRB. Referring now to FIG. 11 an illustration is given for a PUSCH-type mapping of UCI bits to a PRB 1100 using normal cyclic prefix in a slot of an UL subframe. A DMRS signal is mapped to the center SC-FDMA symbol 1104, whereas the encoded and modulated UCI payload is mapped to the other SC-FDMA symbols 1102. Frequency hopping is employed across the two slots of a subframe. Referring back to FIG. 10, the modulated UCI is mapped to logical RB 1002 in each slot of the subframe. In one embodiment of this invention a UE may be configured by RRC signaling with a fixed RB pair to transmit UCI, using PUSCH-type transmission, including CRC attachment, channel encoding with a turbo encoder, scrambling, modulation, interleaving and mapping to a PRB pair. The modulation may be restricted to QPSK resulting in 288 coded bits in a subframe. The output of the encoder may also be rate matched depending on the number of SC-FDMA symbols available for transmission. For example, if HARQ-ACK feedback is to be transmitted in a PRB that overlaps the cell-specific SRS bandwidth in a cell-specific SRS subframe, or the UE is configured or scheduled for periodic or aperiodic SRS transmission in the same subframe, the HARQ-ACK coded bits are rate-matched around the last SC-FDMA symbol of the subframe, which conveys the SRS signal. A semi-static allocation of a fixed PRB pair obviates the need for dynamically signaling a PRB index in the UL system bandwidth. Alternatively, to increase statistical multiplexing a set of two or more resources may be semi-statically configured and then a PUCCH resource indicator selects one out of the set to dynamically signal the DL assignment. In one embodiment the set size is equal to 4, which allows a reuse of the same dynamic signaling that is used for PUCCH Format 3. Herein, the PUCCH resource indicator may be transmitted in the TPC field of a DCI packet scheduling PDSCH on a configured SCell. Although PUSCH-type transmission is used, it is nevertheless a new PUCCH format. Thus, the mapping to RBs in a subframe should hop between slots as shown by 1002 in FIG. 10. The logical-to-physical RB mapping is also defined by the equation for $n_{PRB,0}$ above. The logical RB is given by $m=n_{4,PUCCH}$, where $n_{4,PUCCH}$ is the signaled PUCCH resource and is taken from the range 0 to $N_{RB}^{UL}-1$.

Referring to FIG. 11, the DMRS is a constant amplitude sequence as used for PUCCH Formats 1, 2 and 3. The cyclic shift $N_{CS}$ for the DMRS in each slot may be fixed by specification or semi-statically configured by RRC signaling. In an alternative embodiment, the cyclic shift for the DMRS may be dynamically signaled in the DL DCI format. One motivation for dynamic signaling is when two UEs are allocated the same PRB in a MU-MIMO PUCCH transmission. To support orthogonality between the DMRS signals employed by each UE in a slot, the eNB may dynamically signal different cyclic shifts. For this case the PUCCH resource $n_{4,PUCCH}$ lies in the range 0 to $2*N_{RB}-1$ when up to two UEs may be multiplexed in the same PRB for PUCCH transmission. The logical RB index m for the first slot is given by $m=\text{FLOOR}(n_{4,PUCCH}/2)$. To ensure maximal cyclic shift spacing, an exemplary mapping of signaled PUCCH resource to cyclic shift is given by $N_{CS}=(n_{4,PUCCH} \bmod 2)*N_{SC}/2$ where $N_{SC}=12$ the number of subcarriers in a RB. This ensures that for two UEs assigned to a PRB, a first UE is assigned $N_{CS}=0$ and a second UE is assigned $N_{CS}=6$.

The UL control overhead associated with multiplexing a single UE in a PRB pair is quite high compared to existing PUCCH formats. Increased statistical multiplexing capacity may be obtained by increasing the number of bits used for dynamically signaling the PUCCH resource (equivalently the logical RB index). For example, if a HARQ-ACK resource indication field of 3 bits is inserted in the DCI format transmitted on PDCCH or EPDCCH, the eNB may flexibly signal one out of 8 semi-statically configured PRB pairs for a UE. This increases the scheduling flexibility for the eNB in allocating PRB pairs for either PUSCH or PUCCH transmission.

Other transmission schemes using SF=1 are also possible. In another embodiment, a tail-biting convolutional encoder may be used instead of a turbo encoder to reduce implementation complexity for PUCCH transmission and reception. Furthermore, adding a CRC sequence to the UCI payload enables packet error detection. A CRC fail indicates a NAK for all UCI bits in the payload. This may allow a relaxation of the NACK-to-ACK error and false alarm requirements for PUCCH decoding.

Multi-cell CSI reporting may be transmitted using the same new large payload formats. The eNB may configure the number of periodic CSI reports that may be transmitted in a single UL subframe.

Another aspect of the present invention is the multiplexing of CSI and HARQ-ACK using the PUSCH-type mechanism for PUCCH Format 4. In one embodiment of the invention, UCI bits are ordered as HARQ-ACK bits followed by CSI bits in one UCI packet. A CRC is calculated for the aggregated UCI payload and appended to the payload before it is encoded. The encoder may be a turbo encoder or a tail-biting convolutional encoder. At the output of the encoder, the encoded bits are modulated with QPSK and mapped to PRB pair 1002 as shown in FIG. 10. One limitation of this multiplexing scheme is that if CRC detection fails at the eNB receiver, the UCI bits may be discarded. A different multiplexing scheme is to separately encode the HARQ-ACK and CSI bits. A CRC is independently calculated for both HARQ-ACK and CSI before separate encoding. The encoded outputs are concatenated before mapping to the PRB pair. In an alternative embodiment it may be desirable to provide further error protection for the HARQ-ACK bits. In this case the HARQ-ACK modulated symbols may be mapped to SC-FDMA symbols around the DMRS symbol in each slot of the subframe.

UCI Transmission on PUSCH

Aperiodic CSI feedback may need to support up to 2176 bits for massive CA with 32 DL serving cells if a single CSI process is configured for each serving cell. This overhead in a single serving cell may be prohibitive in many cases. It is more efficient to selectively feedback CSI for subsets of serving cells. In LTE Release 12, a 2-bit CSI request field supports feedback of up to 3 combinations of CSI processes and CSI subframe sets. At a minimum the CSI request field may be increased to 3 or 4 bits to provide more flexibility in requesting CSI feedback for massive CA. For a larger CSI payload, turbo encoding may be employed for better link performance compared to tail-biting convolutional encoding.

For massive CA, the benefits of periodic multi-cell CSI feedback on PUCCH are questionable given the significant overhead. For feedback of 3 cells in a subframe, the UCI payload is up to 33 bits which is on the order of the maximum HARQ-ACK payload for 32 cells and FDD operation. Hence, the eNB may schedule CSI feedback for any subset of activated serving cells. A UE may be configured by RRC signaling to report CSI given a positive CSI request in an UL grant and based on a CSI reporting mode. Different CSI reporting modes may be specified to allow for varying amounts of CSI to be reported, for example, ranging from a single wideband CQI or RI report to reporting PMI and subband CQI for all subbands within the system bandwidth.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A method comprising:
receiving a plurality of control bits;
encoding the control bits with a convolutional encoder to produce encoded control bits;
modulating the encoded control bits to produce Quadrature Phase Shift Keying (QPSK) symbols;
spreading the QPSK symbols with a length-24 Discrete Fourier Transform (DFT) to produce DFT-spread symbols;
mapping the DFT-spread symbols into two contiguous Resource Blocks (RBs);
performing an Inverse Fast Fourier Transform on the DFT-spread symbols to produce Single-Carrier Frequency Division Multiple Access (SC-FDMA) control information symbols in an uplink subframe; and
transmitting the uplink subframe.

2. The method of claim 1, wherein encoding the control bits includes tail-biting convolutional encoding.

3. The method of claim 1, wherein the encoded control bits are rate matched according to a number of frequency tones available for transmission.

4. The method of claim 1, comprising mapping the DFT-spread symbols across the SC-FDMA symbols of a Physical Resource Block (PRB) pair in a subframe.

5. The method of claim 1, wherein the control bits comprise Hybrid Automatic Repeat Request Acknowledgement (HARQ-ACK) bits and Channel State Information (CSI) bits, and wherein a first encoding and rate matching is applied to the HARQ-ACK bits, and a second encoding and rate matching is applied to the CSI bits.

6. The method of claim 5, wherein the HARQ-ACK bits are mapped to the SC-FDMA symbols adjacent a Demodulation Reference Signal (DMRS) SC-FDMA symbol in each slot of a subframe.

7. A method comprising:
receiving a plurality of control bits;
encoding the control bits with a convolutional encoder to produce encoded control bits;
modulating the encoded control bits to produce Quadrature Phase Shift Keying (QPSK) symbols;
spreading the QPSK symbols with a length-24 Discrete Fourier Transform (DFT) to produce DFT-spread symbols;
mapping the DFT-spread symbols into two contiguous Resource Blocks (RBs);
performing an Inverse Fast Fourier Transform on the DFT-spread symbols to produce Single-Carrier Frequency Division Multiple Access (SC-FDMA) control information symbols in an uplink subframe, wherein a Physical Uplink Control Channel (PUCCH) resource index n is dynamically signaled from 0 to a number of uplink RBs minus 1; and
transmitting the uplink subframe.

8. A method comprising:
receiving a plurality of control bits;
encoding the control bits with a convolutional encoder to produce encoded control bits;
modulating the encoded control bits to produce Quadrature Phase Shift Keying (QPSK) symbols;
spreading the QPSK symbols with a length-24 Discrete Fourier Transform (DFT) to produce DFT-spread symbols;
mapping the DFT-spread symbols into two contiguous Resource Blocks (RBs); and
performing an Inverse Fast Fourier Transform on the DFT-spread symbols to produce Single-Carrier Frequency Division Multiple Access (SC-FDMA) control information symbols in an uplink subframe, wherein a Physical Uplink Control Channel (PUCCH) resource index n is dynamically signaled from 0 to two times a number of uplink RBs minus 1; and
transmitting the uplink subframe.

9. A user equipment (UE) comprising a processor and memory, the UE configured to:
receive a plurality of control bits;
encode the control bits with a convolutional encoder to produce encoded control bits;
modulate the encoded control bits to produce Quadrature Phase Shift Keying (QPSK) symbols;
spread the QPSK symbols with a length-24 Discrete Fourier Transform (DFT) to produce DFT-spread symbols;
map the DFT-spread symbols into two contiguous Resource Blocks (RBs);
perform an Inverse Fast Fourier Transform on the DFT-spread symbols to produce Single-Carrier Frequency Division Multiple Access (SC-FDMA) control information symbols in an uplink subframe; and
transmit the uplink subframe.

10. The UE of claim 9, wherein the UE is further configured to encode the control bits using tail-biting convolutional encoding.

11. The UE of claim 9, wherein the encoded control bits are rate matched according to a number of frequency tones available for transmission.

12. The UE of claim 9, wherein the UE is further configured to map the DFT-spread symbols across the SC-FDMA symbols of a Physical Resource Block (PRB) pair in a subframe.

13. The UE of claim 9, wherein a Physical Uplink Control Channel (PUCCH) resource index n is dynamically signaled from 0 to a number of uplink RBs minus 1.

14. The UE of claim 9, wherein a Physical Uplink Control Channel (PUCCH) resource index n is dynamically signaled from 0 to two times a number of uplink RBs minus 1.

15. The UE of claim 9, wherein the control bits comprise Hybrid Automatic Repeat Request Acknowledgement (HARQ-ACK) bits and Channel State Information (CSI) bits, and wherein a first encoding and rate matching is applied to the HARQ-ACK bits, and a second encoding and rate matching is applied to the CSI bits.

16. The UE of claim 15, wherein the HARQ-ACK bits are mapped to the SC-FDMA symbols adjacent a Demodulation Reference Signal (DMRS) SC-FDMA symbol in each slot of a subframe.

* * * * *